(12) United States Patent
Yuenyongsgool et al.

(10) Patent No.: US 12,493,570 B2
(45) Date of Patent: Dec. 9, 2025

(54) DEVICE AND METHODS FOR FUNCTIONAL DESCRIPTOR-BASED DMA CONTROLLER

(71) Applicant: Microchip Technology Incorporated, Chandler, AZ (US)

(72) Inventors: Yong Yuenyongsgool, Gilbert, AZ (US); Andreas Reiter, Feldkirchen-Westerham (DE); Stephen Bowling, Chandler, AZ (US); Anton Alkhimenok, Phoenix, AZ (US); Tim Phoenix, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 20 days.

(21) Appl. No.: 18/621,183

(22) Filed: Mar. 29, 2024

(65) Prior Publication Data

US 2025/0103528 A1    Mar. 27, 2025

Related U.S. Application Data

(60) Provisional application No. 63/540,436, filed on Sep. 26, 2023.

(51) Int. Cl.
*G06F 13/28* (2006.01)
*G06F 7/76* (2006.01)
*G06F 13/16* (2006.01)

(52) U.S. Cl.
CPC .............. *G06F 13/28* (2013.01); *G06F 7/764* (2013.01); *G06F 13/1673* (2013.01)

(58) Field of Classification Search
CPC ....... G06F 7/764; G06F 13/28; G06F 13/1673
See application file for complete search history.

(56) References Cited

U.S. PATENT DOCUMENTS

| | | | | |
|---|---|---|---|---|
| 7,912,997 | B1* | 3/2011 | Murray | G06F 13/28 713/400 |
| 8,495,301 | B1* | 7/2013 | Alexander | G06F 13/28 710/22 |
| 9,463,692 | B2* | 10/2016 | Usui | B60K 35/22 |
| 2006/0268867 | A1* | 11/2006 | Hashimoto | H04L 69/163 370/469 |
| 2008/0126662 | A1 | 5/2008 | Rajbharti | 710/308 |
| 2008/0177909 | A1 | 7/2008 | Sapp et al. | 710/27 |

(Continued)

OTHER PUBLICATIONS

International Search Report and Written Opinion, Application No. PCT/US2024/048272, 10 pages, Dec. 16, 2024.

*Primary Examiner* — Henry Tsai
*Assistant Examiner* — Aurangzeb Hassan
(74) *Attorney, Agent, or Firm* — SLAYDEN GRUBERT BEARD PLLC (57) ABSTRACT

A microcontroller may include a DMA controller, a pattern matching circuit and a memory. The DMA controller may read a first descriptor word in the memory at a location addressed by a first descriptor pointer, and may move an input word from a location in the memory addressed by a source payload pointer to a location in the memory addressed by a destination payload pointer. The pattern matching circuit may perform a pattern matching operation based on the input word and one or more register values. The first descriptor pointer may be modified based on the results of the pattern matching circuit and may generate a second descriptor pointer value.

16 Claims, 7 Drawing Sheets

(56) References Cited

U.S. PATENT DOCUMENTS

| | | | | |
|---|---|---|---|---|
| 2014/0149743 A1* | 5/2014 | Kidron | ............... | G06F 21/85 |
| | | | | 713/160 |
| 2014/0281098 A1* | 9/2014 | Hellwig | ............ | G06F 13/28 |
| | | | | 710/308 |
| 2015/0155044 A1* | 6/2015 | Yin | ................. | G06F 3/0656 |
| | | | | 365/185.24 |
| 2016/0313941 A1* | 10/2016 | Suzuki | ............ | G06F 1/3287 |
| 2021/0143528 A1* | 5/2021 | Wang | ................. | H01Q 1/36 |
| 2022/0138131 A1* | 5/2022 | Zaykov | ............ | G06F 13/1668 |
| | | | | 710/22 |
| 2023/0297377 A1* | 9/2023 | Bhardwaj | ...... | G06F 9/30032 |
| | | | | 712/220 |

* cited by examiner

FIG. 1

| DESCRIPTOR [31:0] | | | |
|---|---|---|---|
| [31:25] | [24:18] | [17:16] | [15:0] |
| 121 | 122 | 123 | 124 |
| 131 | 132 | 133 | 134 |
| 141 | 142 | 143 | 144 |
| ○○○ | ○○○ | ○○○ | ○○○ |

FIG. 2

| DESCRIPTOR [31:0] | | | |
|---|---|---|---|
| [31:25] | [24:18] | [17:16] | [15:0] |
| 221 | 222 | 223 | 224 |
| 231 | 232 | 233 | 234 |
| 241 | 242 | 243 | 244 |
| ○○○ | ○○○ | ○○○ | ○○○ |

DEVICE AND METHODS FOR FUNCTIONAL DESCRIPTOR-BASED DMA CONTROLLER

PRIORITY

This application claims priority to commonly owned U.S. Patent Application No. 63/540,436 filed Sep. 26, 2023, the entire contents of which are hereby incorporated by reference for all purposes.

FIELD OF THE INVENTION

The present disclosure relates to direct memory access (DMA) controllers, more specifically to DMA controllers utilizing functional descriptors to reduce CPU overhead in a processor system.

BACKGROUND

A microcontroller generally comprises a central processing unit (CPU), program and data storage memory, input-output (I/O) ports and a plurality of peripherals fabricated on an integrated circuit (IC) die ("chip"). Some of these peripherals may be core independent peripherals (CIPs), which are defined as peripherals that may operate without requiring input from the CPU.

CIPs may handle their tasks with no code execution by or supervision from a central processing unit (CPU) to maintain operation of the peripheral. As a result, CIPs simplify the implementation of complex control systems and give designers the flexibility to innovate. CIPs are internally integrated and may receive inputs from internal and external sources and may provide outputs to internal and external targets, such as other integrated peripherals or external components.

One such CIP may be a Direct Memory Access (DMA) controller. Microcontroller-based systems may utilize a DMA controller to move data between locations in memory. DMA controllers may reduce the CPU overhead required to move blocks of data between locations in memory, from one or more peripherals to memory, and from memory to one or more peripherals.

DMA controllers may move data from one contiguous block of memory to another contiguous block of memory. In some applications, peripheral controllers expect support for non-contiguous data blocks. Peripheral controllers expect that data may be distributed across non-contiguous blocks and recollected at a later time. In one of various examples, peripherals may utilize a scatter and gather memory storage technique, where data is scattered across a plurality of non-contiguous memory locations and must be gathered for further processing. Such data movement operation with non-contiguous addresses cannot be supported by conventional DMA's addressing modes. As one solution to non-contiguous addresses, DMA controllers may utilize a descriptor table to manage movement of data between memory locations, but this may require large descriptor tables to be built by the CPU.

In addition, operational flow may be controlled by one or more status bit values. In one of various examples, a CPU may poll the one or more status bits and respond accordingly. Status bits may include empty or full notifications, though this is not intended to be limiting.

Movement of data between non-contiguous memory locations and control of operational flow via one or more status bit values may require frequent use of the CPU and may impact the overall system throughput.

There is a need for a DMA controller which may move data between non-contiguous blocks of memory, and which may control operational flow independent of the CPU operation without the need for large descriptor tables.

SUMMARY

The examples herein enable a system for communication between electronic components without the need for a CPU or other processor to be active.

According to one aspect, a device includes a microcontroller comprising a communication circuit, a central processing unit (CPU), a direct-memory access (DMA) controller and a memory, the communication circuit to couple to the CPU and to couple to the DMA controller. The communication circuit includes a trigger configuration register to store trigger configuration settings, an address configuration register to store an address of an external peripheral, a count register to store a numerical value, and at least one user-specified trigger input. The communication circuit enters a peripheral communication mode based on the trigger configuration settings and a trigger event on the at least one trigger input and the communication circuit transfers a number of bytes between the communication circuit and the external peripheral addressed by the address stored in the address configuration register, the number of bytes transferred based on the numerical value stored in the count register. The communication circuit exits the peripheral communication mode based on completion of the transfer of the number of bytes and based on the trigger configuration settings. A DMA controller may couple to a memory and may transfer data between the communication circuit and the memory.

According to one aspect, a system includes an external peripheral and a microcontroller. The microcontroller includes a communication circuit, a CPU, a DMA controller and a memory, the communication circuit to couple to the CPU and the DMA controller. The communication circuit includes a trigger configuration register to store configuration settings, an address configuration register to store an address of the external peripheral, a count register to store a numerical value, at least one user-specified trigger input. The communication circuit enters a peripheral communication mode based on configuration settings in the trigger configuration register and a trigger event on the at least one trigger input. The communication circuit transfers a number of bytes between the communication circuit and the external peripheral addressed by the address stored in the address configuration register, the number of bytes transferred based on the numerical value stored in the count register. The communication circuit exits the peripheral communication mode based on configuration settings in the trigger configuration register. A DMA controller may transfer data between the communication circuit and a memory.

According to one aspect, a method includes steps of writing to one or more configuration registers in a communication circuit, configuring a DMA controller to transfer data between the communication circuit and a memory, receiving a trigger input at the communication circuit, the trigger input based on values stored in at least one of the configuration registers, transferring data between and external peripheral and the communication circuit, the address of the external peripheral based upon a value stored in at least one the configuration registers, and the number of bytes of data to transfer based on a numerical value stored in at least one of the configuration registers, terminating the communication based upon completion of the transferring of data and based on a value stored in at least one of the configuration registers, and transferring data between the communication circuit and the memory based on the configuration of the DMA controller.

DETAILED DESCRIPTION

In a DMA controller, in one of various examples, a source descriptor table may specify a location, data size, and offset values. The location may be specified as a source payload pointer. Offset values may include a first descriptor pointer offset and a second descriptor pointer offset. A source descriptor table may provide additional information not explicitly specified. Respective descriptor table entries may include a first descriptor pointer offset and a second descriptor pointer offset. A destination descriptor table may specify a location, data size, and offset values. Offset values may include a first descriptor pointer offset and a second descriptor pointer offset. The location may be specified as a destination payload pointer. A destination descriptor table may provide additional information not explicitly specified. The location of a descriptor table may be specified by a descriptor pointer.

A descriptor table may be a source descriptor table or a destination descriptor table.

Figure 1:
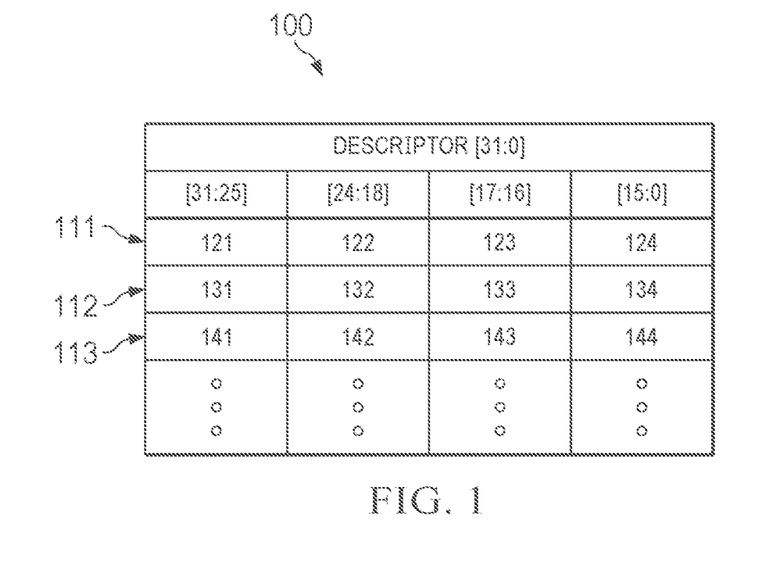
FIG. 1 illustrates one of various examples of a source descriptor table.

FIG. 1 illustrates one of various examples of a source descriptor table 100. Source descriptor table 100 may include a first memory location 111, a second memory location 112 and a third memory location 113. The example illustrated in FIG. 1 includes 3 memory locations, but this is not intended to be limiting.

First memory location 111 may be comprised of a source payload pointer 124, a size field 123, a first descriptor pointer offset 122 and a second descriptor pointer offset 121. Second memory location 112 may be comprised of a source payload pointer 134, a size field 133, a first descriptor pointer offset 132 and a second descriptor pointer offset 131. Third memory location 113 may be comprised of a source payload pointer 144, a size field 143, a first descriptor pointer offset 142 and a second descriptor pointer offset 141. The example illustrated in FIG. 1 includes three memory locations and four fields, but this is not intended to be limiting.

Source payload pointer 124, size field 123, first descriptor pointer offset 122 and second descriptor pointer offset 121 may comprise a source descriptor word. Memory location 111 may be addressed at a source descriptor address as specified by a source descriptor pointer. Memory location 111 may contain a first source descriptor word Memory location 111 may also be termed the base address, as memory location 111 is the first location of the source descriptor table. The example of FIG. 1 illustrates a 32-bit source descriptor word, but this is not intended to be limiting.

In operation, source payload pointer 124 may point to a memory-mapped memory location which may be accessed by a DMA controller. Respective source descriptor words may include different values for respective source payload pointers, size fields, first descriptor pointer offsets and second descriptor pointer offsets.

In one of various examples, a DMA controller may access information in source descriptor table 100 to control data flow. As one of various examples, a DMA controller may read a first source descriptor word at first memory location 111 and may access data at a memory location specified by source payload pointer 124. A DMA controller may read a second source descriptor word at a location determined based on source payload pointer 124, first descriptor pointer offset 122 and second descriptor pointer offset 121. The second source descriptor word may be at second memory location 112 or may be at another memory location within source descriptor table 100, based on the value of first descriptor pointer offset 122 and second descriptor pointer offset 121.

Figure 2:
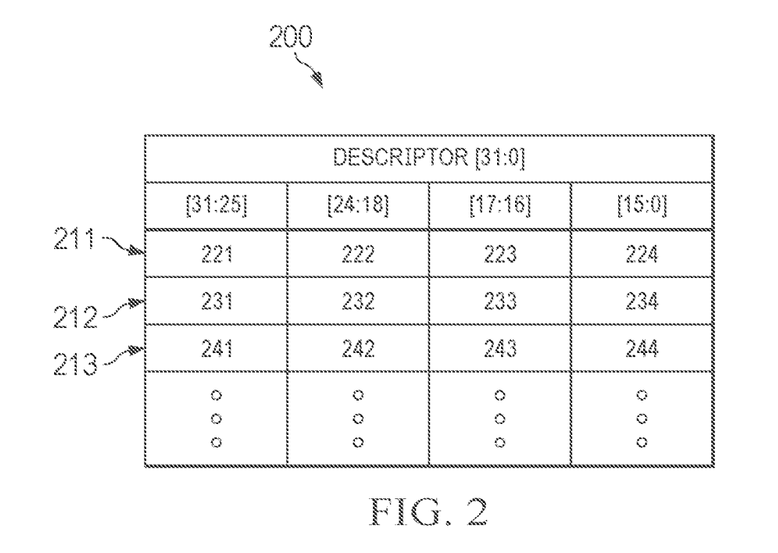
FIG. 2 illustrates one of various examples of a destination descriptor table.

FIG. 2 illustrates one of various examples of a destination descriptor table 200. Destination descriptor table 200 may include a first memory location 211, a second memory location 212 and a third memory location 213.

First memory location 211 may be comprised of a destination payload pointer 224, a size field 223, a first descriptor pointer offset 222 and a second descriptor pointer offset 221. Second memory location 212 may be comprised of a destination payload pointer 234, a size field 233, a first descriptor pointer offset 232 and a second descriptor pointer offset 231. Third memory location 213 may be comprised of a destination payload pointer 244, a size field 243, a first descriptor pointer offset 242 and a second descriptor pointer offset 241. The example illustrated in FIG. 2 includes three memory locations and four fields, but this is not intended to be limiting.

Destination payload pointer 224, size field 223, first destination pointer offset 222 and second destination pointer offset 221 may comprise a destination descriptor word. Memory location 211 may be addressed at a destination descriptor address as specified by a destination descriptor pointer. Memory location 211 may also be termed the base address, as memory location 211 is the first location of the destination descriptor table. The example of FIG. 2 illustrates a 32-bit destination descriptor word, but this is not intended to be limiting.

In operation, destination payload pointer 224 may point to a memory-mapped memory location and may be accessed by a DMA controller. Each memory location may include different values for destination payload pointer 224, size field 223, first descriptor pointer offset 222 and second descriptor pointer offset 221.

In one of various examples, a DMA controller may access information in destination descriptor table 200 to control data flow. As one of various examples, a DMA controller may access a destination descriptor word at first memory location 211 and may move data to a location specified by destination payload pointer 224. A DMA controller may read a second destination descriptor word at a location determined based on destination payload pointer 224, first descriptor pointer offset 222 and second descriptor pointer offset 221. The second destination descriptor word may be accessed at second memory location 212 or may be at another memory location within destination descriptor table 200 based on first descriptor pointer offset 222 and second descriptor pointer offset 221.

Figure 3:
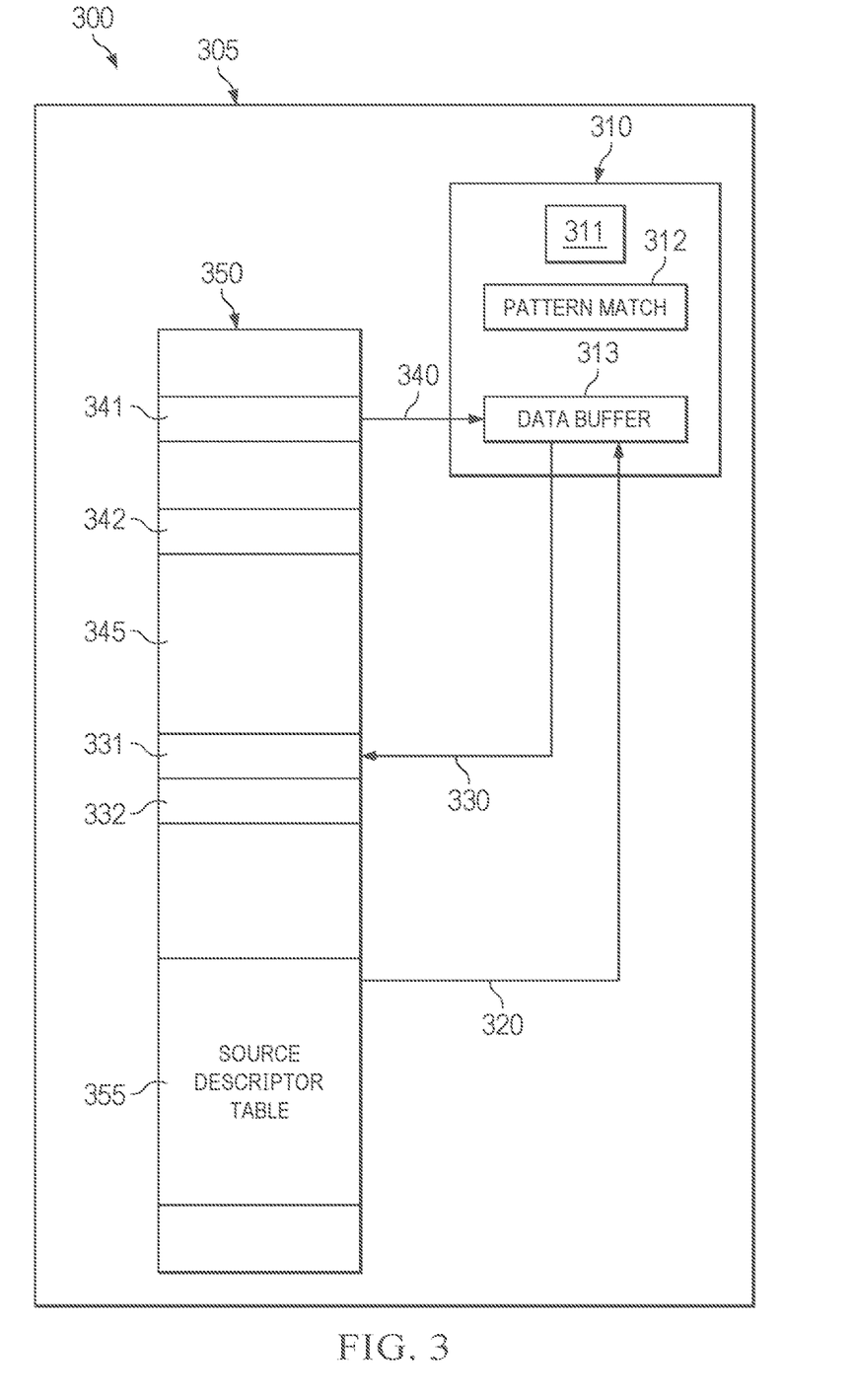
FIG. 3 illustrates one of various examples of a functional descriptor-based DMA controller system.

FIG. 3 illustrates one of various examples of a functional descriptor-based DMA controller system 300.

In system 300, a block of data may be moved from a plurality of disparate memory locations to a contiguous block of memory within memory 350.

Register bank 311 may include a base address value, the base address value to specify a base address location. The base address may be the first source descriptor address. DMA controller circuit 310 may read a first source descriptor word at the base address location from source descriptor table 355 within memory 350, as indicated by path 320. The first source descriptor word may be read into data buffer 313. The first source descriptor word may be a source descriptor word as described and illustrated in reference to FIG. 1. DMA controller circuit 310 may be a CIP within microcontroller 305. DMA controller circuit 310 may read the first source descriptor word and may determine a source payload pointer and a size field based on the first source descriptor word. DMA controller circuit 310 may read an input word from a location in memory 350 addressed by the source payload pointer, as indicated by path 340. DMA controller circuit 310 may write the data read from the source payload pointer location into a location in memory 350 addressed by a destination address, as indicated by path 330. The destination address may be provided by a destination descriptor table or may be provided by a register value.

DMA controller circuit 310 may modify the base address based on the contents of the first source descriptor word and the data read from the location in memory 350 addressed by the source payload pointer to generate a second source descriptor address. DMA controller circuit 310 may modify the base address based on a first descriptor pointer offset or a second descriptor pointer offset to generate a second source descriptor address.

In operation, pattern matching circuit 312 may perform a pattern matching operation based on the input word and based on one or more data words in register bank 311. In one of various examples, if the pattern matching operation returns a boolean TRUE result, the base address may be offset by the value of the first source descriptor offset in the first source descriptor word to generate a second source descriptor pointer. If the pattern matching operation returns a boolean FALSE result, the base address may be offset by the value of the second source descriptor offset in the first source descriptor word to generate a second source descriptor pointer.

DMA controller circuit 310 may read the second source descriptor word at the second source descriptor address. In this manner, DMA controller circuit 310 may read multiple words from memory 350 and move those words to a different location in memory 350. DMA controller circuit 310 may enable a conditional branch operation based on pattern matching circuit 312.

Figure 4:
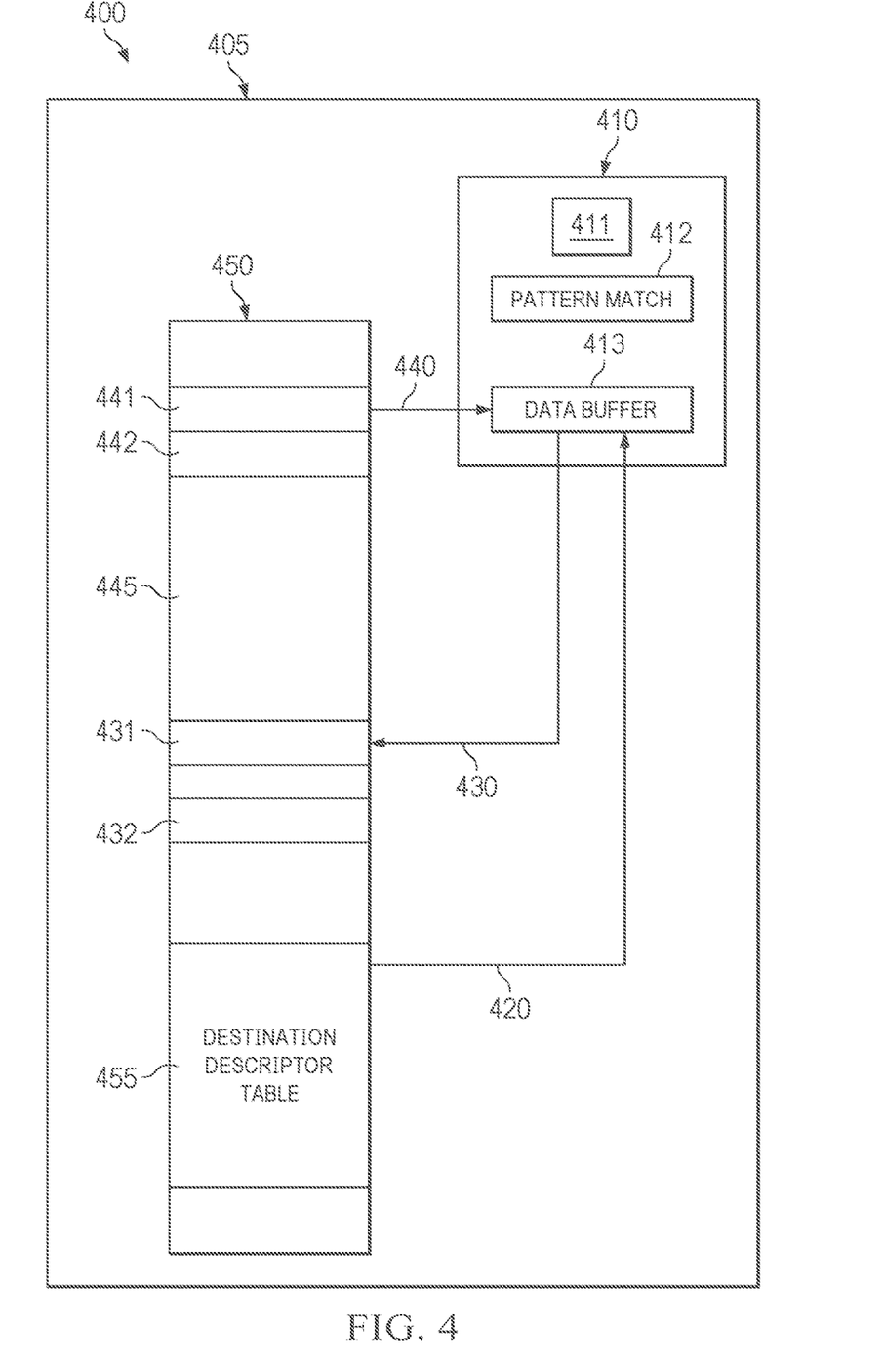
FIG. 4 illustrates another example of a functional descriptor-based DMA controller system.

FIG. 4 illustrates another example of a functional descriptor-based DMA controller system 400. In system 400, a block of data may be moved from a contiguous block of memory to a plurality of disparate memory locations.

Register bank 411 may include a base address value, the base address value to specify a base address location. The base address may be a first destination descriptor address. DMA controller circuit 410 may read a first destination descriptor word at the base address location from destination descriptor table 455 within memory 450, as indicated by path 420. The first destination descriptor word may be read into data buffer 413. The first destination descriptor word may be a destination descriptor word as described and illustrated in reference to FIG. 2. DMA controller circuit 410 may be a CIP within microcontroller 405. DMA controller circuit 410 may read the first destination descriptor word and may determine a destination payload pointer based on the first destination descriptor word. DMA controller circuit 410 may read data from a location in memory 450 addressed by the source payload pointer, as indicated by path 440. The source payload pointer may be stored in register bank 411 or may be read from a source descriptor table. DMA controller circuit 410 may write the data read from the source payload pointer location into a location in memory 450 addressed by the destination payload pointer, as indicated by path 430.

DMA controller circuit 410 may modify the base address based on the data read from the location in memory 450 addressed by the source payload pointer to generate a second destination descriptor address. DMA controller circuit 410 may modify the first destination descriptor address based on a first descriptor pointer offset or a second descriptor pointer offset to generate a second destination descriptor address.

In operation, pattern matching circuit 412 may perform a pattern matching operation based on the data in data buffer 413 and based on one or more data words in register bank 411. In one of various examples, if the pattern matching operation returns a boolean TRUE result, the first destination descriptor address may be offset by the value of the first destination descriptor offset in the first destination descriptor word. If the pattern matching operation returns a boolean FALSE result, the first destination descriptor address may be offset by the value of the second destination descriptor offset in the first destination descriptor word.

DMA controller circuit 410 may read a second destination descriptor word at the second destination descriptor address. In this manner, DMA controller circuit 410 may read multiple words from memory 450 and move those words to a different location in memory 450. DMA controller circuit 410 may enable a conditional branch operation based on pattern matching circuit 412. DMA controller circuit 410 may implement a loop of operations based on the conditional branch operation and based on the first descriptor pointer and the second descriptor pointer.

Figure 5:
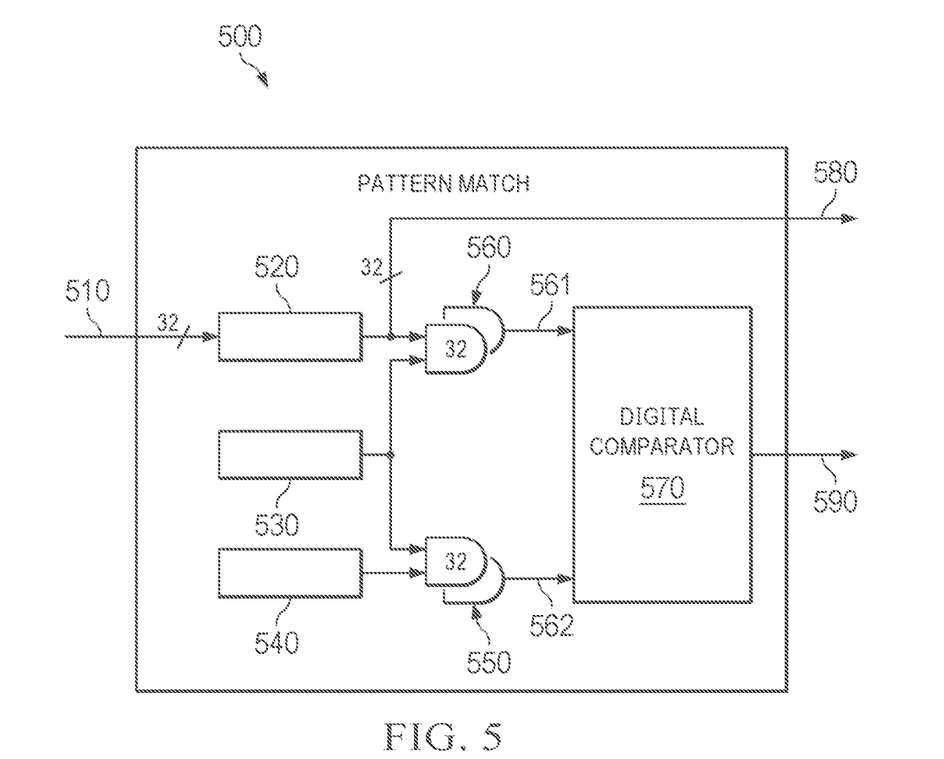
FIG. 5 illustrates a circuit for pattern matching.

FIG. 5 illustrates a pattern matching circuit 500. Pattern matching circuit 500 may include input word 510. Input word 510 may be input to a buffer 520. The example illustrated in FIG. 5 uses a 32-bit input word 510, but this is not intended to be limiting.

Buffer 520 may be input to a first input of first AND gate 560. Mask word 530 may be input to a second input of first AND gate 560. First AND gate 560 may perform a bit-wise AND function between the contents of buffer 520 and mask word 530. First AND gate 560 may mask bits of buffer 520 based on the contents of mask word 530. One or more bits of input word 510 may be present in output 561, based on the value of mask word 530. It should be understood that the illustration of first AND gate 560 represents an AND gate for each respective bit of the output of buffer 520 and of mask word 530.

In one of various examples, mask word 530 may be a 32-bit word, and may contain value 0xffffffff, or 32 consecutive logic high values. In this example, all 32 bits of input word 510 may be present in output 561. In another example, mask word 530 may contain value 0x80000000, or a single high value at the most significant bit position. In this example, only the most significant bit of input word 510 may be present in output 561. In this manner, a single bit of input word 510 may be masked. In one of various examples, a single bit of input word 510 may indicate a data channel, an error condition, or any other condition not specifically mentioned.

Mask word 530 may be input to a first input of second AND gate 550. Pattern word 540 may be input to a second input of second AND gate 550. Pattern word 540 may be stored in a register or memory location. Second AND gate 550 may mask bits of pattern word 540 based on the contents of mask word 530. It should be understood that the illustration of second AND gate 550 represents an AND gate for each respective bit of the output of pattern word 540 and of mask word 530.

In one of various examples, pattern word 540 may be a 32-bit word, and may contain value 0xffffffff, or 32 consecutive logic high values. Mask word 530 may contain value 0xf0000000, or logic high values in the 4 most significant bit positions. In this example, the 4 most significant bits of pattern word 540 may be masked by second AND gate 550 and may be present at output 562. In one of various examples, a logic high value in the 4 most significant bits may represent an overload condition.

Digital comparator 570 may compare outputs of first AND gate 560 and second AND gate 550 and may perform a logic operation and generate match output 590. In one of various examples, digital comparator 570 may perform a bit-wise AND of the outputs of first AND gate 560 and second AND gate 550.

Mask word 530 may contain value 0xf0000000, or logic high values in the 4 most significant bit positions. In one of various examples, pattern word 540 may be a 32-bit word, and may contain value 0xffffffff, or 32 consecutive logic high values. First AND gate 560 may mask the 4 most significant bits of input word 510 and generate output 561, and second AND gate may mask the 4 most significant bits of pattern word 540 and generate output 562. Digital comparator 570 may compare output 561 and output 562. In one of various examples, digital comparator 570 may perform a bit-wise AND operation, and may set match output 590 to a logic high value if output 561 and output 562 are identical. In this example, a logic high value in the 4 most significant bits of input word 510 may indicate an overload condition, and match output 590 may be set to a logic high value to indicate an overload condition. Other bits of input word 510 may indicate other conditions and other values of mask word 530 and pattern word 540 may be set to mask other bits of input word 510.

In this manner, pattern matching circuit 500 may mask bits of buffer 520 and pattern word 540 and may output match output 590 based on the masked bits. Digital comparator 570 may implement other logical functions including but not limited to a logical AND.

Match output 590 may control updates to a descriptor pointer. In one of various examples, a logic high match output may update a descriptor pointer based on a first descriptor pointer offset, and a logic low match output may update a descriptor pointer based on a second descriptor pointer offset.

Figure 6:
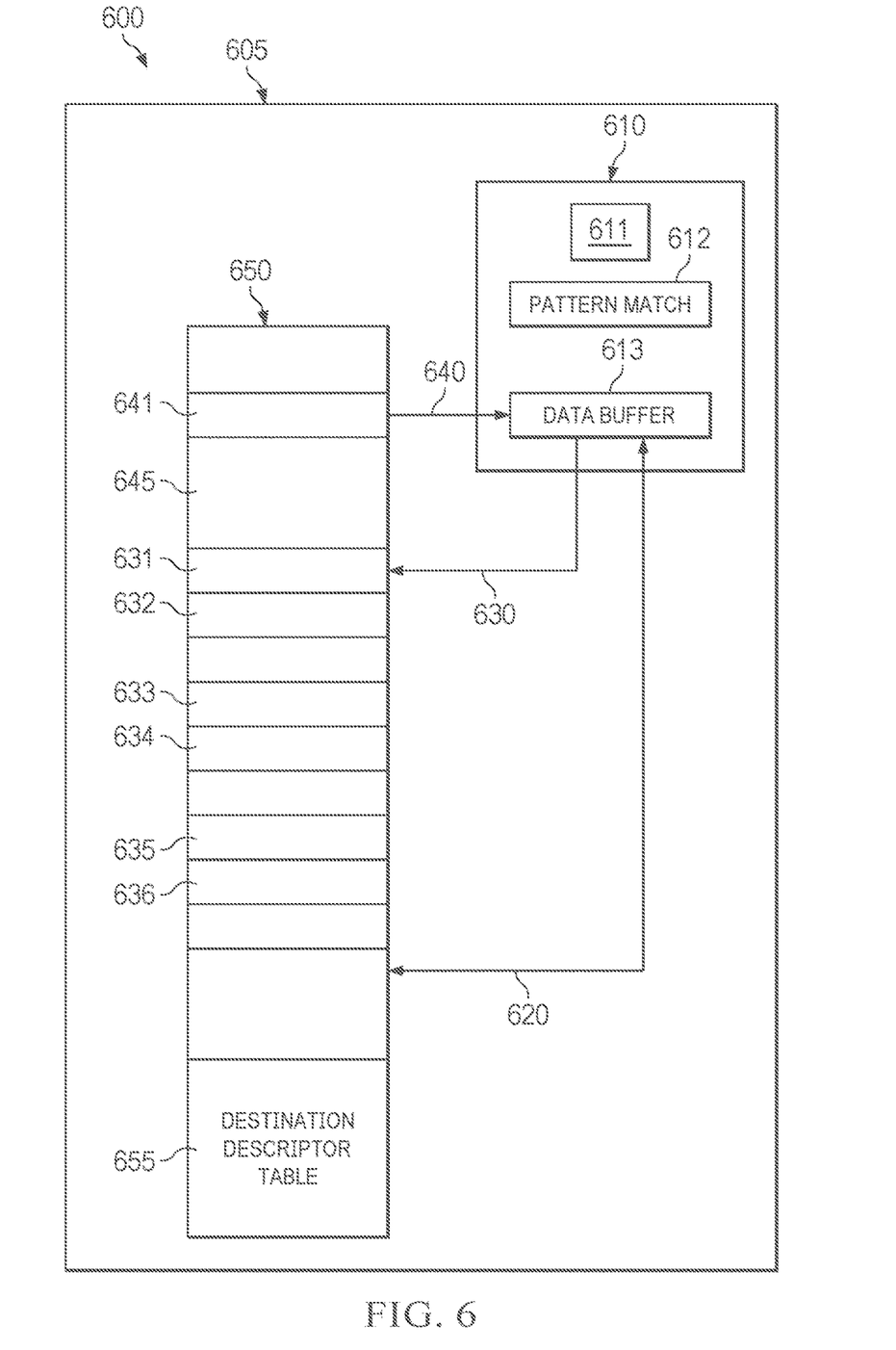
FIG. 6 illustrates one of various examples of a scatter gather memory system.

FIG. 6 illustrates one of various examples of a scatter gather memory system 600.

Register bank 611 may include a base address value, the base address value to specify a base address location. The base address may also be termed a destination descriptor pointer. DMA controller circuit 610 may read a first destination descriptor word at the base address location from destination descriptor table 655 within memory 650, as indicated by path 620. The first destination descriptor word may be read into data buffer 613. The first destination descriptor word may be a destination descriptor word as described and illustrated in reference to FIG. 2. DMA controller circuit 610 may be a CIP within microcontroller 605. DMA controller circuit 610 may read the first destination descriptor word and may determine a destination payload pointer based on the first destination descriptor word. DMA controller circuit 610 may read data from a location in memory 650 addressed by the source payload pointer, as indicated by path 640. DMA controller circuit 610 may read data from location 641. The source payload pointer may be stored in register bank 611 or may be read from a source descriptor table. DMA controller circuit 610 may write the data read from the source payload pointer location into a location in memory 650 addressed by the destination payload pointer, as indicated by path 630. Data may be written to source payload pointer location 631.

Pattern matching circuit 612 may perform a pattern matching operation based on the data read from location 641 and data in register bank 611. Register bank 611 may store a mask word and a pattern word and may perform a pattern matching operation based as described and illustrated in FIG. 5. The input word as described in FIG. 5 may be the data read from location 641.

A first descriptor offset value may be read from the first destination descriptor word. A second descriptor offset value may be read from the first destination descriptor word. If the pattern matching operation results in a Boolean TRUE result, the destination descriptor pointer may be updated based on adding the first descriptor offset to the base address. If the pattern matching operation results in a Boolean FALSE result, the destination descriptor pointer may be updated based on adding the second descriptor offset to the base address.

DMA controller circuit 610 may update the destination payload pointer in the first destination descriptor word and may write the updated value of the destination payload pointer to destination descriptor table 655, as indicated by path 620. In this manner, a small descriptor table may be built initially, and such a descriptor table may be updated during operation, saving memory size over a solution requiring a larger descriptor table to be built initially.

DMA controller circuit 610 may read a second destination descriptor word at the destination descriptor pointer location from destination descriptor table 655 within memory 650, as indicated by path 620. The second destination descriptor word may be read into data buffer 613. The second destination descriptor word may be a destination descriptor word as described and illustrated in reference to FIG. 2. DMA controller circuit 610 may be a CIP within microcontroller 605. DMA controller circuit 610 may read the second destination descriptor word and may determine a destination payload pointer based on the second destination descriptor word. DMA controller circuit 610 may read data from a location in memory 650 addressed by the source payload pointer, as indicated by path 640. DMA controller circuit 610 may read data from location 641. The source payload pointer may be stored in register bank 611 or may be read from a source descriptor table. DMA controller circuit 610 may write the data read from the source payload pointer location into a location in memory 650 addressed by the destination payload pointer, as indicated by path 630. Data may be written to destination payload pointer location 633.

Pattern matching circuit 612 may perform a pattern matching operation based on the data read from location 641 and data in register bank 611. Register bank 611 may store a mask word and a pattern word and may perform a pattern matching operation based as described and illustrated in FIG. 5. The input word as described in FIG. 5 may be the data read from location 641.

A first descriptor offset value may be read from the second destination descriptor word. A second descriptor offset value may be read from the second destination descriptor word. If the pattern matching operation results in a Boolean TRUE result, the destination descriptor pointer may be updated based on adding the first descriptor offset to the destination descriptor pointer. If the pattern matching operation results in a Boolean FALSE result, the destination descriptor pointer may be updated based on adding the second descriptor offset to the destination descriptor pointer.

DMA controller circuit 610 may update the destination payload pointer in the second destination descriptor word. DMA controller circuit 610 may optionally write the updated value of the destination payload pointer to destination descriptor table 655, as indicated by path 620.

DMA controller circuit 610 may read a third destination descriptor word at the destination descriptor pointer location from destination descriptor table 655 within memory 650, as indicated by path 620. The third destination descriptor word may be read into data buffer 613. The second destination descriptor word may be a destination descriptor word as described and illustrated in reference to FIG. 2. DMA controller circuit 610 may be a CIP within microcontroller 605. DMA controller circuit 610 may read the third destination descriptor word and may determine a destination payload pointer based on the third destination descriptor word. DMA controller circuit 610 may read data from a location in memory 650 addressed by the source payload pointer, as indicated by path 640. DMA controller circuit 610 may read data from location 641. The source payload pointer may be stored in register bank 611 or may be read from a source descriptor table. DMA controller circuit 610 may write the data read from the source payload pointer location into a location in memory 650 addressed by the destination payload pointer, as indicated by path 630. Data may be written to destination payload pointer location 635.

Pattern matching circuit 612 may perform a pattern matching operation based on the data read from location 641 and data in register bank 611. Register bank 611 may store a mask word and a pattern word and may perform a pattern matching operation based as described and illustrated in FIG. 5. The input word as described in FIG. 5 may be the data read from location 641.

A first descriptor offset value may be read from the third destination descriptor word. A second descriptor offset value may be read from the third destination descriptor word. If the pattern matching operation results in a Boolean TRUE result, the destination descriptor pointer may be updated based on adding the first descriptor offset to the destination descriptor pointer. If the pattern matching operation results in a Boolean FALSE result, the destination descriptor pointer may be updated based on adding the second descriptor offset to the destination descriptor pointer.

The first descriptor offset may be a negative value, such that the destination descriptor pointer may be updated to a smaller valued memory location and may enable a loop between a small number of destination descriptor table locations. In one of various examples, DMA controller circuit 610 may access data from a multi-channel ADC and may loop between destination descriptor table locations for each of the channels of the ADC. A second iteration may write the ADC data to memory locations 632, 634, and 636 in a similar manner to the first iteration which writes to memory location 631, 633 and 635.

DMA controller circuit 610 may update the destination payload pointer in the third destination descriptor word and may write the updated value of the destination payload pointer to destination descriptor table 655, as indicated by path 620.

Figure 7:
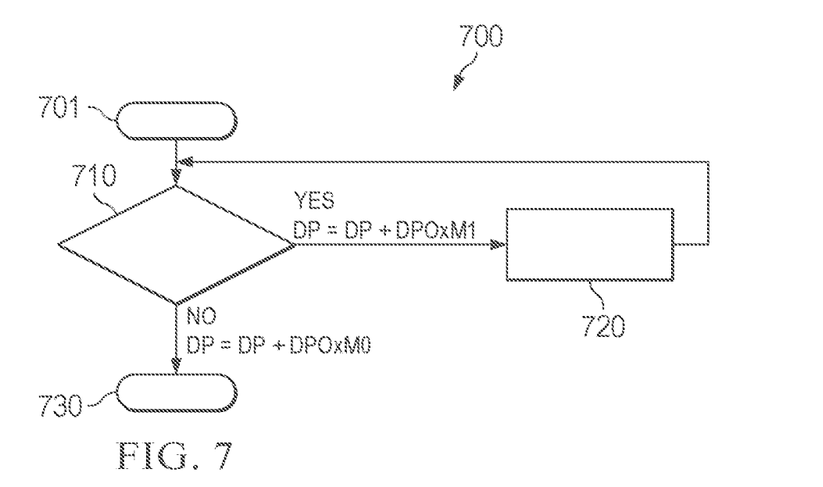
FIG. 7 illustrates one of various examples of a flowchart of a pattern matching operation.

FIG. 7 illustrates one of various examples of a method 700 to implement a pattern match. At operation 710, a comparison may be performed between one or more data values. The data words may include a mask word, an input word and a pattern word, as described in reference to FIG. 5. If the comparison result is a match, at operation 720, data may be moved by a DMA controller based on the result of the pattern match, and based on the one or more input words. A first pointer offset may be added to the descriptor pointer. If the comparison does not result in a match, a second pointer offset may be added to the descriptor pointer. In one of various examples, the one or more input words may comprise a data value read from a memory location addressed by a source payload pointer. Based on the result of the pattern match, the DMA controller may apply one of a first source pointer offset and the second source pointer to the descriptor pointer to generate an updated descriptor pointer, and the DMA controller may access the next descriptor word based on this updated descriptor pointer.

Figure 8:
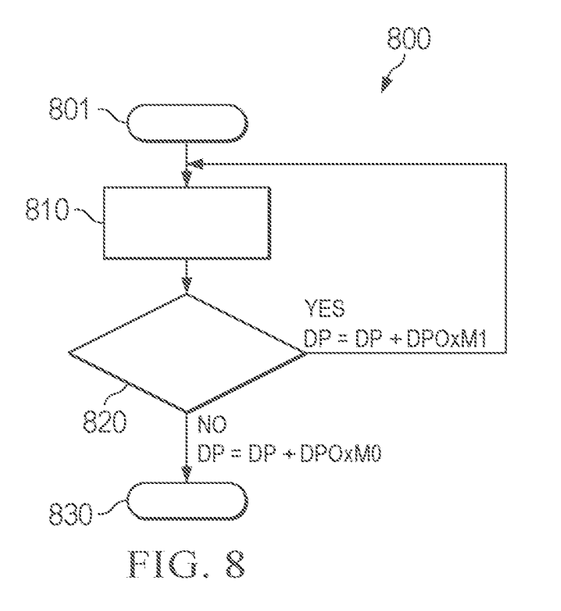
FIG. 8 illustrates another example of a flowchart of a pattern matching operation.

FIG. 8 illustrates another example of a method 800 to implement a pattern match. At operation 810, data may be moved by a DMA controller based on the result of a pattern match and based on one or more data values. The data words may include a mask word, an input word and a pattern word, as described in reference to FIG. 5. In one of various examples, the one or more data values may comprise a destination payload pointer, a first destination pointer offset, and second destination pointer offset. At operation 820, a comparison may be performed between at least one of the mask word, the input word and the pattern word. If the comparison result is a pattern match, the DMA controller may apply a first pointer offset to the destination pointer to generate an updated destination pointer, and the updated destination pointer may be used to access a next descriptor. If the comparison does not result in a match, the DMA controller may apply a second pointer offset to the destination pointer to generate an updated destination pointer, and the updated destination pointer may be used to access a next descriptor.

Figure 9:
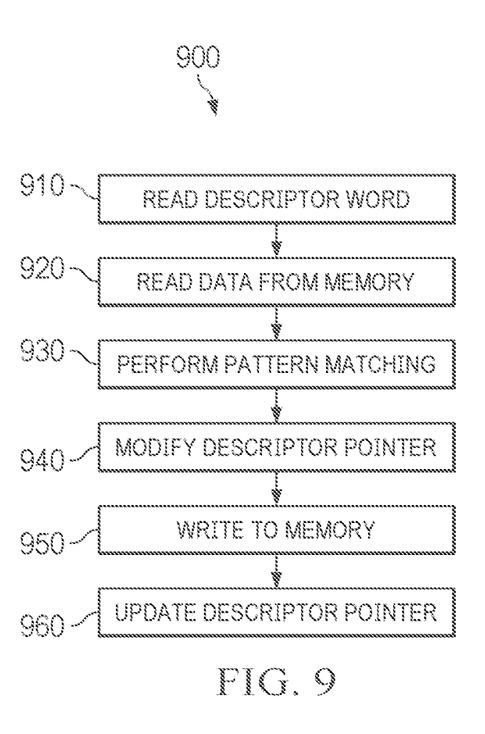
FIG. 9 illustrates a method of moving data in a DMA controller system.

FIG. 9 illustrates one of various examples of a method of transferring data within a memory.

At operation 910, a DMA controller may read a descriptor word from a descriptor table within a memory, the descriptor word addressed by a descriptor pointer, and may store the descriptor word in a data buffer.

At operation 920, the DMA controller may read data from a first location in the memory, the first location based on the contents of the data buffer and may write the data read from the memory to a second location.

At operation 930, the DMA controller may perform a pattern matching operation based on the data read from the first location and may update the descriptor pointer based on the results of the pattern matching operation.

Although example embodiments have been described above, other variations and embodiments may be made from this disclosure without departing from the spirit and scope of these embodiments.

The invention claimed is:

1. A microcontroller comprising:
    a DMA controller circuit comprising a data buffer and a pattern matching circuit;
    a memory coupled to the DMA controller, the memory comprising a descriptor table;
    wherein the DMA controller circuit:
        reads data into the data buffer from a location in the descriptor table, the location specified by a first descriptor pointer;
        reads an input word within the memory at a location specified by a source payload pointer and writes the input word to an address specified by a destination payload pointer;
        performs a pattern matching operation in the pattern matching circuit based on the input word and one or more register values to generate a pattern matching result;
        modifies the first descriptor pointer based on the value of the first descriptor pointer and the result, of the pattern matching operation to generate a second descriptor pointer;
        updates the first descriptor pointer in the descriptor table at the first descriptor pointer, and
        wherein the descriptor table comprises a source descriptor table, the source descriptor table comprising the source payload pointer, a size field, a first descriptor pointer offset and a second descriptor pointer offset.

2. The microcontroller as claimed in claim 1, the pattern matching operation comprising a bit-wise AND operation based on the input word, a mask word and a pattern word.

3. The microcontroller as claimed in claim 2, the pattern matching circuit to add the first descriptor pointer offset to the first descriptor pointer based on a first result of the pattern matching operation.

4. The microcontroller as claimed in claim 2, the pattern matching circuit to add the second descriptor pointer offset to the first descriptor pointer based on a second result of the pattern matching operation.

5. The microcontroller as claimed in claim 1, the descriptor table comprising a destination descriptor table, the destination descriptor table comprising a destination payload pointer, a size field, a first descriptor pointer offset and a second descriptor pointer offset.

6. The microcontroller as claimed in claim 5, the pattern matching operation comprising a bit-wise AND operation based on the input word, a mask word and a pattern word.

7. The microcontroller as claimed in claim 6, the pattern matching circuit to add the first descriptor pointer offset to the first descriptor pointer based on a first result of the pattern matching operation.

8. The microcontroller as claimed in claim 6, the pattern matching circuit to add the second descriptor pointer offset to the first descriptor pointer based on a second result of the pattern matching operation.

9. The microcontroller as claimed in claim 1, the source payload pointer comprising a register value.

10. The microcontroller as claimed in claim 5, the source payload pointer comprising contents of the destination descriptor table.

11. The microcontroller as claimed in claim 5, the destination payload pointer comprising a register value.

12. A method comprising:
    reading a descriptor table in a memory at an address specified by a first descriptor pointer and reading a descriptor word into a data buffer;
    reading an input word within the memory based on the contents of the data buffer;
    performing a pattern matching operation based on the input word and one or more register values to generate a pattern matching result;
    writing the input word to the memory based on the contents of the data buffer;
    modifying the first descriptor pointer based on the value of the first descriptor pointer and the result of the pattern matching operation; and
    updating the first descriptor pointer in the descriptor table at the address specified by the first descriptor pointer.

13. The method as claimed in claim 12, the pattern matching operation comprising a bit-wise AND operation based on the input word, a mask word and a pattern word.

14. The method as claimed in claim 12, the pattern matching circuit to add a first descriptor pointer offset to the first descriptor pointer based on a first result of the pattern matching operation.

15. The method as claimed in claim 12, the pattern matching circuit to add a second descriptor pointer offset to the first descriptor pointer based on a second result of the pattern matching operation.

16. The method as claimed in claim 12, the updating the first descriptor pointer comprising incrementing or decrementing the payload pointer.

* * * * *